Dec. 10, 1963 C. E. LYTH 3,114,058
SHOCK ACCELERATION MEASURING APPARATUS
Filed Oct. 29, 1959 2 Sheets-Sheet 1
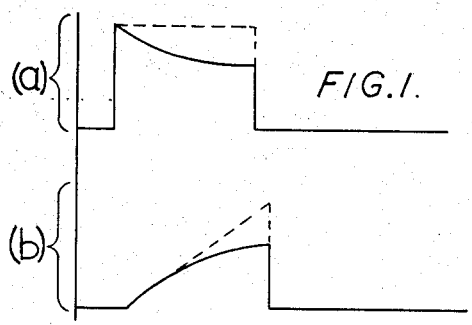
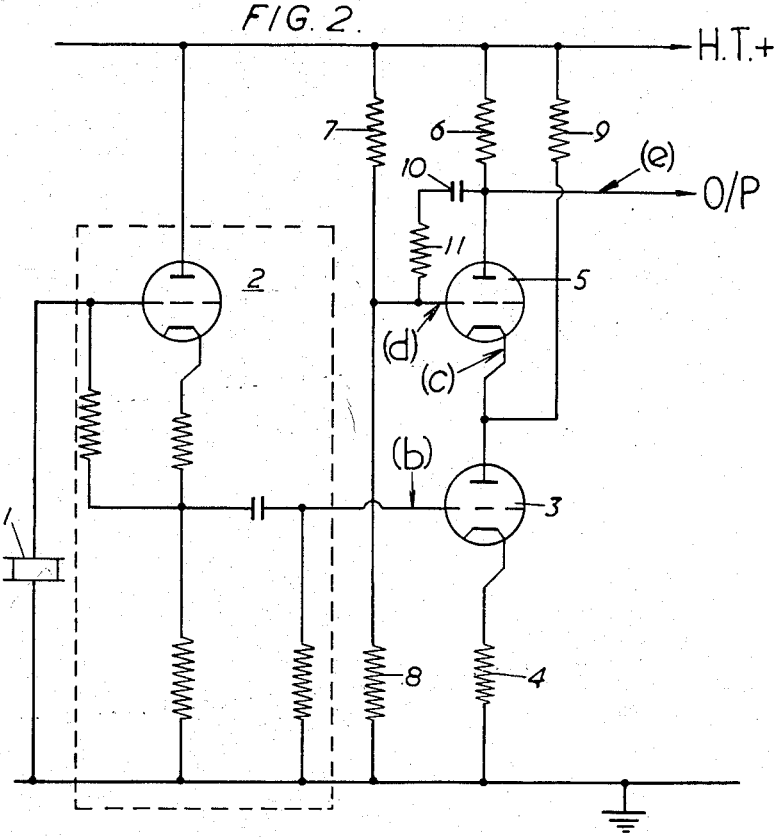
*Inventor*
CYRIL EDWARD LYTH Inventor
CYRIL EDWARD LYTH _United States Patent Office_ 3,114,058
Patented Dec. 10, 1963

3,114,058
SHOCK ACCELERATION MEASURING APPARATUS
Cyril Edward Lyth, Failsworth, Manchester, England, assignor to Ferranti, Limited, Hollinwood, Lancashire, England, a company of the United Kingdom of Great Britain and Northern Ireland
Filed Oct. 29, 1959, Ser. No. 849,480
Claims priority, application Great Britain Nov. 4, 1958
1 Claim. (Cl. 310—8.1)

This invention relates to shock acceleration measuring apparatus (hereinafter referred to as accelerometers) of the kind including a piezo-electric or electrostatic transducer which is subjected to the shock, the acceleration of which it is desired to measure. As a result of the shock the transducer develops a voltage which at any instant is proportional to the instantaneous acceleration and therefore a voltage pulse is produced having a similar shape to the changing acceleration, the maximum amplitude of the voltage pulse corresponding to the peak acceleration.

Known accelerometers of the above kind suffer from the disadvantage that the inherent capacitances and resistances of the transducer and the connections and the input resistance of the measuring apparatus form in effect a network having a time-constant such as to cause an exponential distortion of the voltage waveform produced by the transducer. The distortion caused in the case of a simple rectangular pulse waveform is shown in FIGURE 1(a) and that in the case of a triangular pulse waveform is shown in FIGURE 1(b) of the accompanying drawings, the distortion in the case of negative-going waveforms being an inverted form of that shown for positive going waveforms. The distortion thus caused renders it difficult to obtain a correct measurement of the acceleration, especially the peak acceleration.

It is accordingly an object of the present invention to provide an accelerometer of the kind including a piezo-electric or an electrostatic transducer in which the above disadvantage is obviated.

According to the present invention an accelerometer of the kind including a piezo-electric or an electrostatic transducer arranged to be subjected to mechanical shock in proportion to the acceleration to be measured includes an amplifier arranged to deliver a voltage proportional to the transducer output voltage, said amplifier including a network arranged to provide during each voltage pulse from the transducer an exponentially decreasing negative feedback of waveform such as to compensate for the exponential distortion caused by the inherent capacitances and resistances of the transducer.

Figure 3:
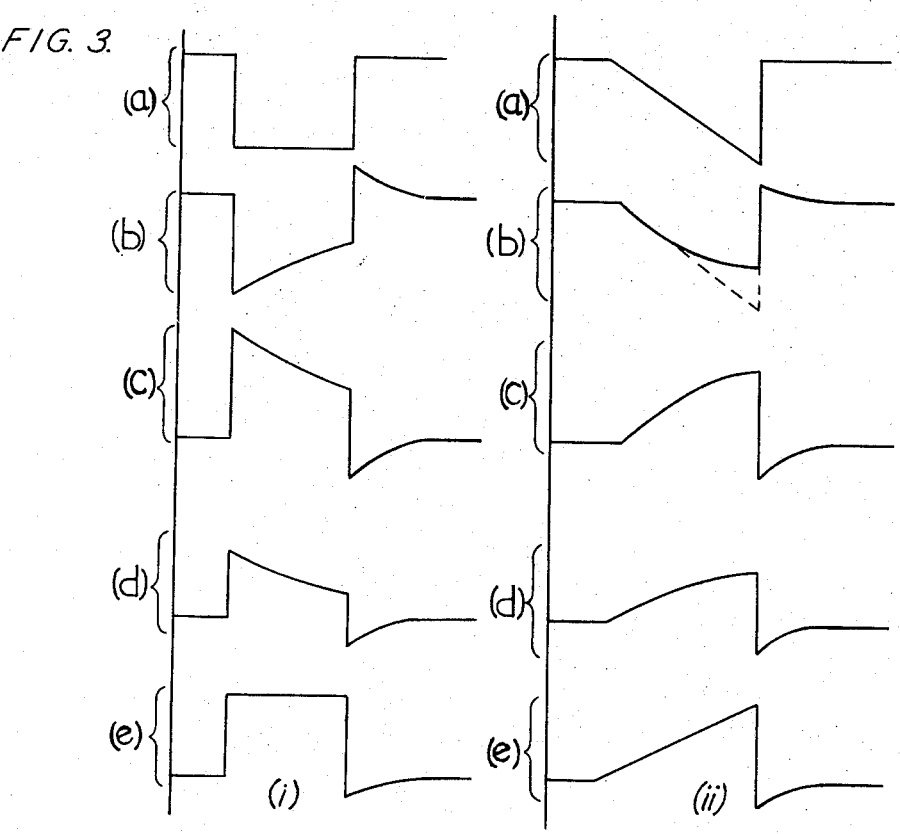
Figure 4:
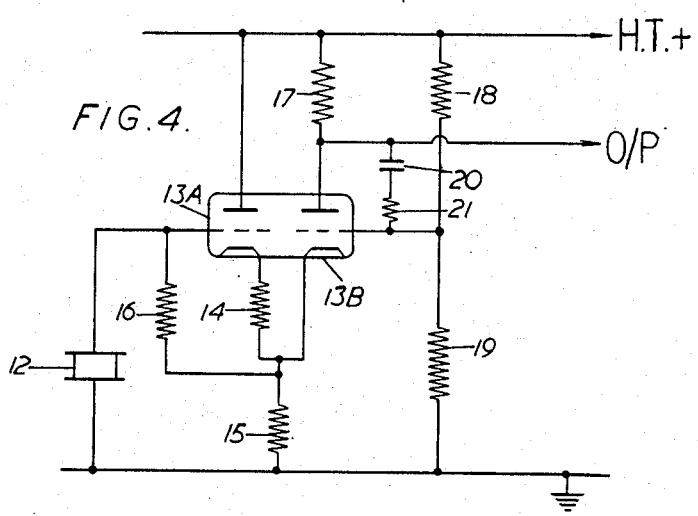

The invention will now be described by way of example with reference to the accompanying drawings in which:

FIGURES 1(a) and (b) are waveforms showing the exponential distortion caused by accelerometers of known kind, FIGURE 2 is a circuit diagram of one embodiment of the invention, FIGURE 3 is a set of waveforms to illustrate the operation of the circuit of FIGURE 2, and FIGURE 4 is a circuit diagram of a further embodiment of the invention.

Referring now to FIGURE 2 of the drawings the circuit of the accelerometer shown includes a piezo-electric transducer 1 connected via a cathode-follower stage 2 (shown enclosed by a dotted line) to the control grid of a triode amplifier valve 3, the purpose of the cathode-follower stage 2 being to present a high impedance to the piezo-electric transducer 1. The cathode of the valve 3 is connected to earth through a resistor 4 and the anode of the valve 3 is directly connected to the cathode of a further triode amplifier valve 5. The anode of the valve 5 is connected to the positive pole of a high tension supply through a resistor 6, the negative side of the high tension supply being earthed. The control grid of the valve 5 is connected to the common point of two resistors 7 and 8 forming a potentiometer connected across the high tension supply.

The valves 3 and 5 connected in the manner so far described form a two-stage cathode-coupled amplifier, sometimes known as a "cascade" amplifier, the operation of which is well known. A resistor 9 is connected between the positive pole of the high tension supply and the anode of the valve 3 in order to increase the current flowing through the valve 3 during operation.

This amplifier is modified according to the present invention by providing a negative feedback path between the anode of the valve 5 and the control grid thereof in the form of a capacitor 10 and a resistor 11.

Referring now to FIGURE 3(i) of the drawings a voltage pulse of rectangular waveform resulting from a shock response of the transducer 1 is shown at (a). This pulse is distorted as described above by an exponential fall-off from the leading edge of the pulse and the waveform at the grid of the valve 3 is as shown at (b) in FIGURE 3(i). The waveform appearing at the cathode of the valve 5 is therefore as shown at (c), and the output at the anode of the valve 5, in the absence of negative feedback would be an amplified version of the waveform shown at (c), this being the output of known accelerometers of this kind.

The negative feedback introduced by the capacitor 10 and resistor 11, however, causes a voltage of waveform as shown at (d) to appear on the control grid of the valve 5. The capacitor 10 passes the sharp leading edge of the waveform at the anode of the valve 5, thus applying a maximum negative feedback which thereafter falls off exponentially as the capacitor 10 charges. Thus the resultant voltage waveform at the anode of the valve 5 is the substantially accurate rectangular waveform shown at (e). This output is delivered to an oscilloscope or other suitable measuring instrument.

FIGURE 3(ii) of the drawings shows the corresponding waveforms in the case of a triangular pulse. It should be noted from FIGURE 3(ii)d that whereas the voltage fed back to the grid of the valve 5 is increasing, the actual proportion of the voltage fed back is decreasing in an exponential manner due to the charging of the capacitor 10.

The capacitor 10 and resistor 11 are given suitable values to compensate for the fall-off of the longest rectangular pulse which the instrument will be required to accept in practice. Other factors which influence their values include the amplifier circuit impedances at the anode and grid of the valve 5 and the amplification between these electrodes in the absence of feedback. The capacitor 10 is usually chosen to have a large value—of the order of 0.05 microfarad—so that the other capacitances of the stage can be neglected.

FIGURE 4 shows a circuit of a further embodiment of the invention. In this circuit a piezo-electric transducer 12 is connected between earth and the control grid of a triode amplifier valve 13A forming one half of a double triode valve. The cathode of the valve 13A is connected to earth through resistors 14 and 15, the anode of the valve 13A being connected directly to the positive pole of a high tension supply, the negative pole of which is connected to earth. A resistor 16 is connected between the control grid of the valve 13A and the common point of the resistors 14 and 15.

The second half of the double triode valve, valve 13B, has its cathode connected to the common point of the resistors 14 and 15, the anode being connected to the positive pole of the high tensions supply through a resistor 17. The control grid of the valve 13B is connected to the common point of two resistors 18 and 19 forming a potentiometer connected across the high tension supply.

Negative feedback is applied, in accordance with the invention, between the anode and the control grid of the valve 13B by means of a capacitor 20 and a resistor 21.

In operation the valve 13A together with the resistors 15 and 16 acts as a cathode follower, the resistor 14 providing a cathode bias voltage. The valve 13B is cathode-coupled to the valve 13A to act as an amplifier, the negative feedback introduced by the capacitor 20 and the resistor 21 acting to correct the waveform of the output in a manner similar to that described above with reference to FIGURE 3. With this circuit, however, a negative-going input pulse developed by the piezo-electric transducer 12 results in a negative-going output pulse. This may, of course, be simply inverted by the introduction of further stages if a positive-going output pulse is required.

In the two circuits described above the negative feedback has been introduced into an intermediate point in the amplifier. The invention is equally applicable where the feedback is introduced at the input to the amplifier as a whole, but in this case other circuit parameters, such as coupling capacitors and resistors, restrict the choice of values for the feedback components. It has therefore been found more suitable to introduce the negative feedback at an intermediate point, as described above.

It will be appreciated that the piezo-electric transducer described above may be replaced by an electrostatic transducer.

What I claim is:

In an accelerometer of the kind including a piezo-electric or electrostatic transducer arranged to be subjected to mechanical shock in proportion to the acceleration to be measured and to develop a voltage pulse the amplitude of which at any instant is proportional to the instantaneous acceleration, and wherein the waveform of said voltage pulse is exponentially distorted by the inherent capacitances and resistances of the transducer and the connections to the transducer, an amplifier connected to said transducer for delivering a voltage proportional to the transducer output voltage, said amplifier having two stages so arranged that the output of the first stage is applied to the cathode of the second stage and including a feedback network connected between the anode and the control grid of the second stage for providing during each voltage pulse received from the transducer an exponentially decreasing negative feedback having a waveform such as to compensate for the exponential distortion of the voltage waveform received from the transducer, said feedback network consisting of a resistor and a capacitor connected in series, the values of said resistor and capacitor being such as to compensate for the fall-off of the longest voltage pulse received from the transducer.

References Cited in the file of this patent
UNITED STATES PATENTS

| | | |
|---|---|---|
| 2,429,775 | Seright | Oct. 28, 1947 |
| 2,594,841 | Arndt | Apr. 29, 1952 |
| 2,697,756 | Bessire | Dec. 21, 1954 |
| 2,849,629 | Kissinger | Aug. 26, 1958 |
| 2,857,462 | Lin | Oct. 21, 1958 |
| 2,920,280 | Penticost | Jan. 5, 1960 |
| 2,948,859 | Hostetter | Aug. 9, 1960 |

FOREIGN PATENTS

| | | |
|---|---|---|
| 717,055 | Great Britain | Oct. 20, 1954 |